(12) United States Patent
Matsushima

(10) Patent No.: US 8,203,664 B2
(45) Date of Patent: Jun. 19, 2012

(54) ELECTRO-OPTICAL DEVICE AND ELECTRONIC APPARATUS

(75) Inventor: Seiichi Matsushima, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 379 days.

(21) Appl. No.: 12/572,467

(22) Filed: Oct. 2, 2009

(65) Prior Publication Data

US 2010/0123849 A1 May 20, 2010

(30) Foreign Application Priority Data

Nov. 14, 2008 (JP) ................................ 2008-291999

(51) Int. Cl.
*G02F 1/1333* (2006.01)
*G09F 13/04* (2006.01)
(52) U.S. Cl. ............. 349/58; 349/56; 349/62; 362/97.1
(58) Field of Classification Search .................... 349/56, 349/58, 61, 62; 362/97.1, 97.2, 97.3, 97.4
See application file for complete search history.

(56) References Cited

U.S. PATENT DOCUMENTS

| | | | | |
|---|---|---|---|---|
| 6,816,213 | B2 * | 11/2004 | Kato et al. | 349/58 |
| 6,894,739 | B2 | 5/2005 | Sung et al. | |
| 6,919,940 | B2 * | 7/2005 | Noh | 349/58 |
| 2004/0125267 | A1 * | 7/2004 | Noh | 349/58 |
| 2006/0011797 | A1 | 1/2006 | Akagawa et al. | |
| 2007/0008451 | A1 | 1/2007 | Tanaka | |
| 2008/0106667 | A1 * | 5/2008 | Fukuda | 349/58 |
| 2010/0123849 | A1 * | 5/2010 | Matsushima | 349/58 |

FOREIGN PATENT DOCUMENTS

| | | |
|---|---|---|
| JP | 6-167581 A | 6/1994 |
| JP | 6-265851 A | 9/1994 |
| JP | 2001-194649 A | 7/2001 |
| JP | 2004-13152 A | 1/2004 |
| JP | 2006-30672 A | 2/2006 |
| JP | 2007-17696 A | 1/2007 |

* cited by examiner

*Primary Examiner* — Brian Healy
(74) *Attorney, Agent, or Firm* — AdvantEdge Law Group, LLC

(57) ABSTRACT

An electro-optical device includes an electro-optical panel, a backlight unit and a mounting case. The mounting case includes a sidewall and a support portion provided inside the sidewall. The support portion has a notch portion that faces to the side surface of the backlight unit.

6 Claims, 5 Drawing Sheets

ELECTRO-OPTICAL DEVICE AND ELECTRONIC APPARATUS

BACKGROUND

1. Technical Field

The present invention relates to an electro-optical device such as a liquid crystal device including an electro-optical panel such as a liquid crystal panel and a backlight unit for irradiating light onto the electro-optical panel, and an electronic apparatus including the electro-optical device.

2. Related Art

Electro-optical devices such as liquid crystal devices are used as display devices for computers, mobile telephones or other various electronic apparatuses. In particular, since the liquid crystal devices are light weight, slim and have low power consumption, the liquid crystal devices are widely used as display devices for various electronic apparatuses. In general, in a liquid crystal device, on a rear surface of a liquid crystal panel, an illumination light source and a backlight unit, in which a light guide plate for guiding the light of the light source to the panel, a diffusion plate or the like is configured as one unit, are disposed. The backlight unit irradiates the light from the rear surface side to the liquid crystal panel so as to display a desired image in a pixel region of a front surface side.

In general, the liquid crystal panel and the backlight unit are integrally held by any unit, and are, for example, held in a mounting case. If the liquid crystal panel and the backlight unit are held in the mounting case, for example, a support portion protruding from a sidewall of the mounting case inwardly is formed, the liquid crystal panel is disposed on one side of the support portion so be mounted in the mounting case, and the backlight unit is disposed on the other side of the support portion to be mounted in the mounting case (see JP-A-2007-17696).

However, in the liquid crystal device in which the liquid crystal panel and the backlight unit are held in the mounting case, if a foreign matter is sandwiched between the liquid crystal panel and the backlight unit in the mounting case, the backlight unit is detached from the mounting case and the foreign matter is eliminated and cleaned. However, for a high-accuracy design, since the gap formed between the mounting case and the backlight unit is hardly noticeable, it is difficult to detach the backlight unit from the mounting case.

SUMMARY

An advantage of some aspects of the invention is that it provides an electro-optical device and an electronic apparatus, which are capable of easily detaching a backlight unit from a mounting case and simply eliminating foreign matter sandwiched between an electro-optical panel and the backlight unit in the mounting case.

According to an aspect of the invention, there is provided an electro-optical device including a mounting case having support portions protruding inward from its sidewalls; an electro-optical panel configured by inserting an electro-optical material between a pair of substrates and disposed on one side of the support portions so as to be mounted in the mounting case; and a backlight unit disposed on the other side of the support portions so as to be mounted in the mounting case, wherein a notched portion is formed in at least one of the sidewalls at a mounting side of the backlight unit.

According to the invention, by the notched portion formed in the sidewalls of the mounting case, it is possible to easily detach the backlight unit from the mounting case. Accordingly, if a foreign matter is sandwiched between the electro-optical panel and the backlight unit in the mounting case, the backlight unit is detached from the mounting case and the foreign matter is simply eliminated and cleaned. Since the backlight unit can be detached from the mounting case by inserting tweezers or the like from the notched portion and bringing the tweezers into contact with the side surface of the backlight unit, it is possible to minimally suppress the surface of the backlight unit from being damaged by the detachment. By facilitating the detachment of the backlight unit from the mounting case, when a foreign matter is inserted, the foreign matter is eliminated so as not to produce a defective product, but so as to produce a regular product. Accordingly, it is possible to improve the yield of the electro-optical device.

In the electro-optical device of the invention, the backlight unit may be detachably fixed to the other side of the support portions.

According to the invention, since the backlight unit is detachably fixed, it is possible to further facilitate the detachment of the backlight unit from the mounting case.

In the electro-optical device, the backlight unit is fixed to the other side of the support portions by a fine adhesive tape.

According to the invention, the backlight unit can be detachably fixed in a very simple manner.

In the electro-optical device, the depth of the notched portion is smaller than the thickness of the backlight unit.

According to the invention, it is possible to prevent the surface of the backlight unit from being damaged when tweezers or the like are inserted from the notched portion, prevent foreign matter from being introduced between the backlight unit and the electro-optical panel from the notched portion, and prevent light from being leaked from the notched portion.

In the electro-optical device, the mounting case includes: a frame which holds the electro-optical panel and the backlight unit; and a light-shielding member having an engagement portion engaged with the backlight unit in the sidewalls.

According to the invention, it is possible to stably hold the electro-optical panel and the backlight unit in the frame and the light-shielding member. In addition, by releasing the engagement of the engagement portion of the light-shielding member, it is possible to easily detach the electro-optical panel and the backlight unit. When the repair or the replacement of the electro-optical panel or the backlight unit is necessary, it is possible to easily and rapidly take countermeasures. In addition, in the case where the electro-optical panel or the backlight unit is attached to the frame, even when attachment is released, it is possible to prevent the electro-optical panel or the backlight unit from being detached from the frame.

According to another aspect of the invention there is provided an electronic apparatus including the electro-optical device according to the invention.

According to the invention, the electronic apparatus having the effects of the electro-optical device of the invention can be configured.

BRIEF DESCRIPTION OF THE DRAWINGS

The invention will be described with reference to the accompanying drawings, wherein like numbers reference like elements.

DESCRIPTION OF EXEMPLARY EMBODIMENTS

Electro-optical Device of Embodiment

Figure 1A:
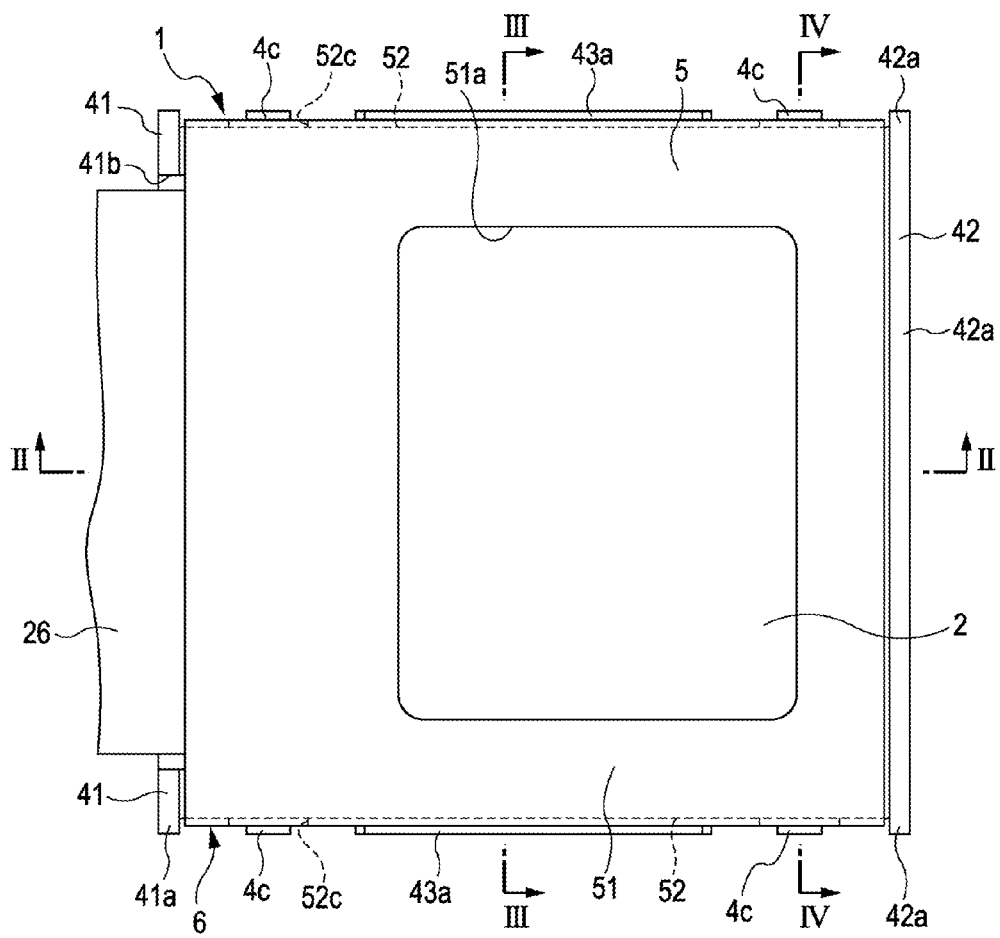
FIG. 1A is a plan view showing a liquid crystal device as an electro-optical device according to an embodiment of the invention.
Figure 1B:
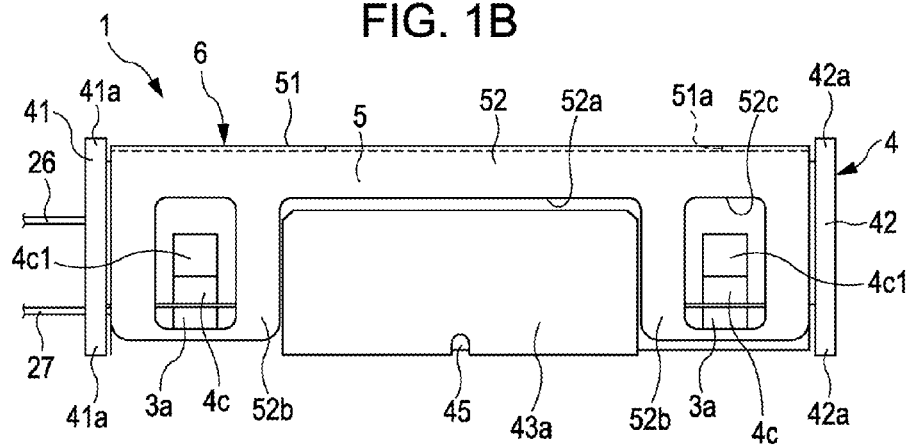
FIG. 1B is a side view thereof.
Figure 2:
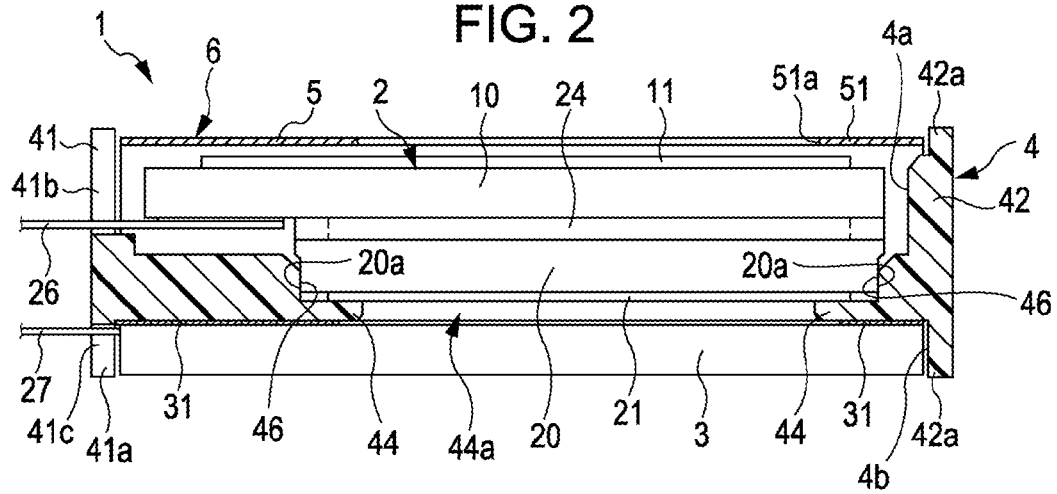
FIG. 2 is a cross-sectional view taken along line II-II of FIG. 1.
Figure 3:
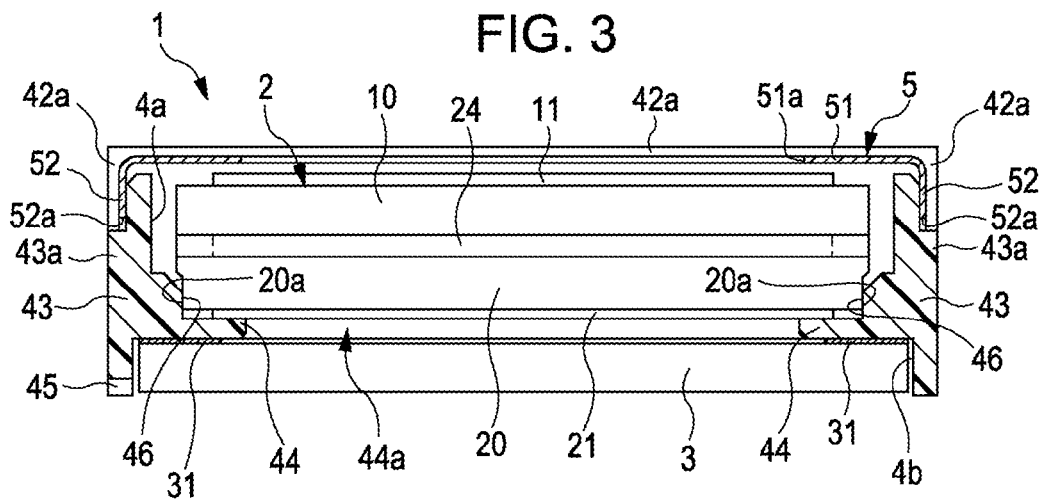
FIG. 3 is a cross-sectional view taken along line III-III of FIG. 1.
Figure 4:
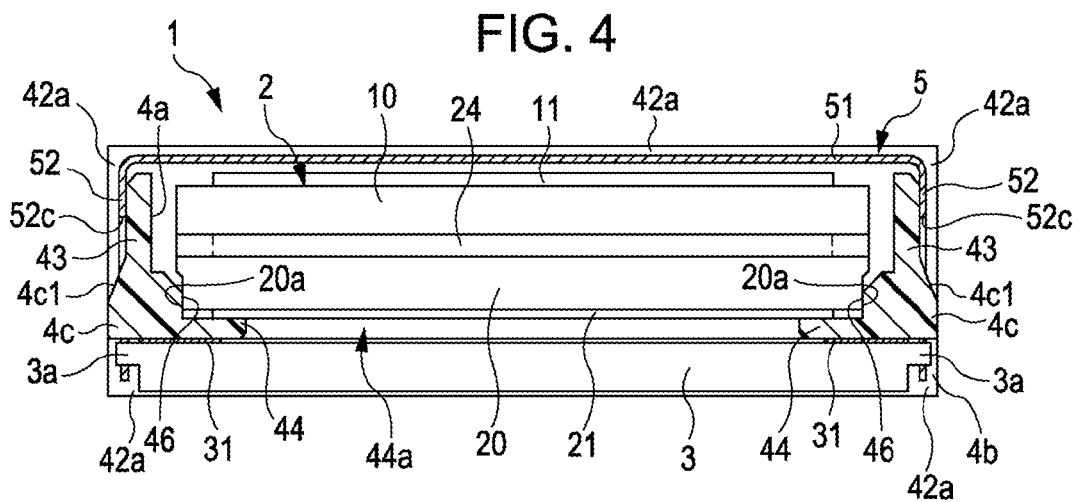
FIG. 4 is a cross-sectional view taken along line IV-IV of FIG. 1.

A liquid crystal device of an embodiment will be described as an example of an electro-optical device according to the invention. FIG. 1A is a plan view showing an electro-optical device according to the embodiment, FIG. 1B is a side view thereof. FIGS. 2, 3 and 4 are respectively cross-sectional views taken along line II-II, III-III and IV-IV of FIG. 1.

In a liquid crystal device 1 as the electro-optical device according to the present embodiment, as shown in FIGS. 1 to 4, a liquid crystal panel 2 functioning as an electro-optical panel and a backlight unit 3 disposed on the rear surface side of the liquid crystal panel 2 are held in a mounting case 6. The mounting case 6 includes a frame 4 for holding the liquid crystal panel 2 and the backlight unit 3, and a light-shielding member 5 functioning as a cover which is disposed so as to cover at least a portion of the liquid crystal panel 2 held in the frame 4.

As shown in FIGS. 1 to 4, the frame 4 includes sidewalls 41 and 42 facing each other in one direction such as a front-and-rear direction, and sidewalls 43 and 43 facing each other in a direction across the sidewalls 41 and 42, includes support portions 44 protruding from the sidewalls 41 to 43 inward, and the cross section thereof is formed substantially in a H-shaped frame with the partition-like support portions 44 having a light transmission opening 44a in the center thereof. The frame 4 is, for example, formed of polycarbonate and is colored in black. The liquid crystal panel 2 is received and mounted in one concave portion 4a (a concave portion positioned above the support portions 44 in FIGS. 2 to 4) of the H-shaped frame 4 corresponding to one side of the support portions 44, and the backlight unit 3 is received and mounted in the other concave portion 4b (a concave portion positioned below the support portions 44 in FIGS. 2 to 4) corresponding to the other side of the support portions 44.

The liquid crystal panel 2 and the backlight unit 3 are held in the frame 4 so as to be respectively fitted to the concave portions 4a and 4b. The liquid crystal panel 2 is, for example, formed by dicing by half the periphery of a counter substrate 20 from the side opposite to a device substrate 10, and includes an inner side surface 20a with a step difference from a side surface of the liquid crystal panel 2. The inner side surface 20a is fitted to a fitting surface 46 protruding inward from the sidewalls 41 to 43 so as to be mounted in the concave portion 4a of the frame 4. That is, the inner side surface 20a of the counter substrate 20 and the fitting surface 46 are formed with fitting sizes. The backlight unit 3 is fitted to the concave portion 4b composed of the surfaces of the backlight unit side of the support portions 44 the inner surfaces of the sidewalls 41 to 43. Protrusions 41a and 42a having a flange shape, which can prevent light leaking from the backlight unit 3, are respectively formed in the sidewalls 41 and 42, and the light-shielding member 5 is disposed between protrusions 41a and 42a.

The liquid crystal panel 2 and the backlight unit 3 are preferably bonded to the frame 4 by an adhesive, a double-sided adhesive tape or the like, if necessary. In the present embodiment, the liquid crystal panel 2 is fixed to the frame 4 by the support portions 44 and the like using an adhesive. The backlight unit 3 is bonded to the other surfaces (the lower surfaces in FIGS. 2 to 4) of the support portions 44 of the frame 4 of the liquid crystal panel 2 using a double adhesive tape 31 having a rectangular frame shape and also functioning as a light-shielding member for preventing light from being irradiated onto a region excluding a predetermined region with respect to the liquid crystal panel 2. If the backlight unit 3 is detachably fixed by a fine adhesive tape or the like, it is possible to facilitate a detaching operation when detaching the backlight unit 3 from the frame 4.

As shown in FIGS. 1 to 4, the light-shielding member 5 has a top plate 51 for covering one surface (the upper surface in FIGS. 2 to 4) of the liquid crystal panel 2 received in the frame 4 and sidewalls 52 and 52 is bent from the top plate 51 at about a right angle at both ends of the width direction (the left-and-right direction in FIGS. 3 and 4) of the top plate 51. The top plate 51 covers an outer surface side of one surface side of the liquid crystal panel 2 and the facing sidewalls 52 and 52 cover portions of the outer surfaces of the facing sidewalls 43 and 43 of the frame 4. A window portion 51a formed by opening a portion at a position corresponding to a pixel region 2A of the liquid crystal panel 2 shown in FIG. 5 is provided in the top plate 51 of the light-shielding member 5, and the top plate 51 is disposed so as to cover the peripheral region of the pixel region 2A of the liquid crystal panel 2. The light-shielding member 5 is, for example, formed of stainless, aluminum or the like and a visible outer side surface thereof is colored in black such that the display contrast is increased and glare can be prevented during viewing.

In the present embodiment, the sidewalls 52 of the light-shielding member 5 and the backlight unit 3 are connected in a state in which the liquid crystal panel 2 and the backlight unit 3 are held in the frame 4, such that four members 2 to 5 are integrally formed. As the connection unit between the sidewalls 52 of the light-shielding member 5 and the backlight unit 3, engagement holes 52c of engagement portions are formed in the sidewalls 52 and 52, engaging protrusions 3a engaged with the engagement holes 52c are integrally provided in the left and right ends of the backlight unit 3 of FIG. 4, and the connection is achieved between the engagement holes 52c and the engagement protrusions 3a. In addition, the engagement structure between the light-shielding member 5 and the backlight unit 3 and the configuration of the engagement portion provided in the light-shielding member 5 are arbitrary, and, for example, a configuration in which a convex portion having a claw shape is provided on the light-shielding member 5 side as the engagement portion, a concave portion is provided on the side of the backlight unit 3 side, and the convex portion and the concave portion are engaged may be implemented. In the drawing, a reference numeral 43a denotes extension portions integrally protruding on the outer surface sides of the sidewalls 43 and 43 of the frame 4 outer than the sidewalls 52 of the light-shielding member 5. Concave portions 52a are respectively formed in the sidewalls 52 and 52 in order to avoid interference with the extensions 43a, and the engagement holes 52c are formed in the downward protrusions 52b and 52b located on both sides of the concave portions 52a.

A notched portion 45 is formed in an edge of a side, in which the backlight unit 3 is mounted, of one extension portion 43a configuring one sidewall 43. In the present embodiment, the notched portion 45 is notched in a substantially U-shape, the shape thereof is arbitrary, and, for example, a substantially rectangular shape or a substantially V-shape may be used. The depth of the notched portion 45 is arbitrary, but, like the present embodiment, is preferably smaller than the thickness of the backlight unit 3. Accordingly, it is possible to prevent the surface of the backlight unit 3 from being damaged when tweezers or the like are inserted from the notched portion 45, prevent foreign matter from being introduced between the backlight unit 3 and the liquid crystal panel 2 from the notched portion 45, and prevent light from being leaked from the notched portion 45. The width of the notched portion 45 is preferably, for example, about 1 to 3 mm. Accordingly, it is possible to improve the workability when tweezers or the like are inserted from the notched portion 45 so as to detach the backlight unit 3, prevent dust from being introduced from the notched portion 45 into the frame 4, and prevent light leaking from the notched portion 45. The notched portion 45 may be formed in at least one of the four sidewalls 41 to 43 and may be formed in an appropriate sidewall of the sidewalls 41 to 43 as necessary.

The engagement protrusions 3a engaged with the engagement holes 52c are provided on both the left and right ends of the backlight unit 3 of FIG. 4 in correspondence with the engagement holes 52c two by two. In the drawing, the reference numeral 4c denotes guide protrusions that are provided on the outer surfaces of the sidewalls 43 and 43 of the frame 4 in the vicinities of the engagement protrusions 3a, and inclined surfaces 4c1 are in the substantially upper half portions of the guide protrusions 4c. When the engagement holes 52c are engaged with the engagement protrusions 3a of the backlight unit 3, the lower edges of the engagement holes 52c of the sidewalls 52 are pressed and opened outwards by the guide protrusions 4c and the engagement protrusions 3a and the lower edges of the sidewalls 52 get over the guide protrusions 4c and the engagement protrusions 3a such that the engagement holes 52c are engaged with the engagement protrusions 3a.

Figure 5A:
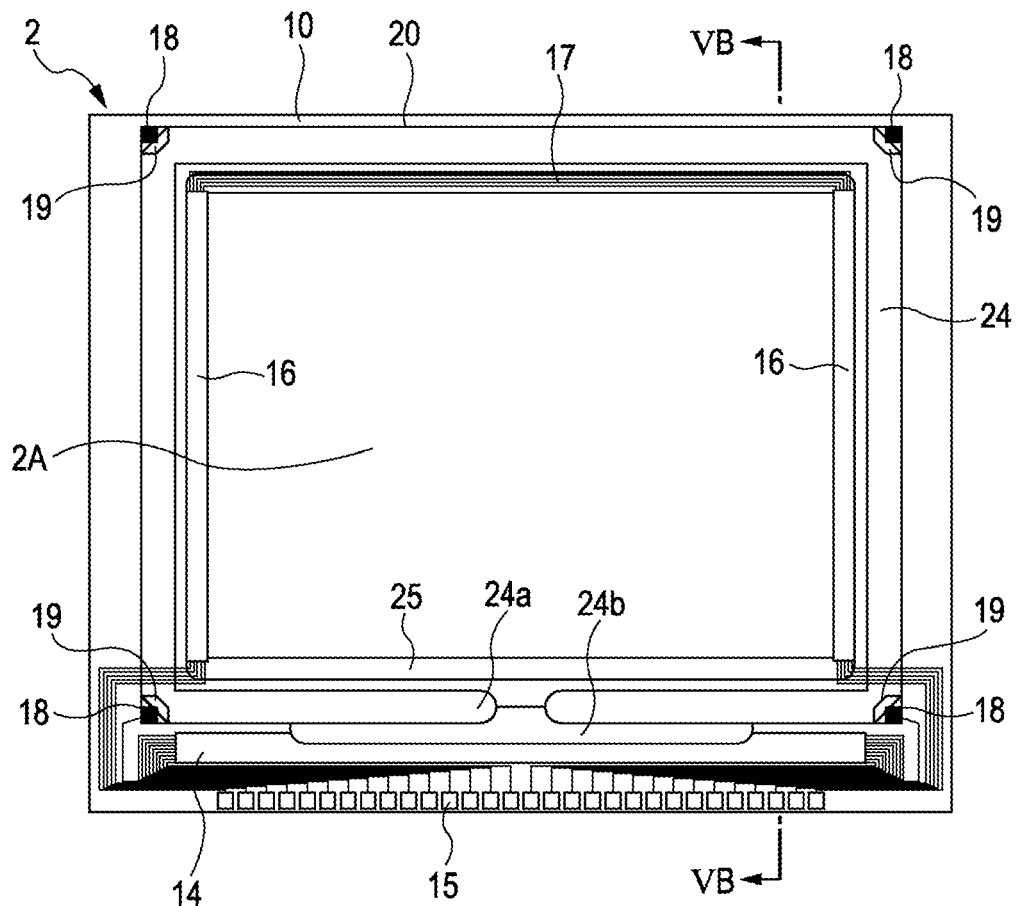
FIG. 5A is a plan view showing an example of the detailed configuration of a liquid crystal panel as an electro-optical panel and FIG. 5B is a cross-sectional view taken along line VB-VB of FIG. 5A.
Figure 5B:
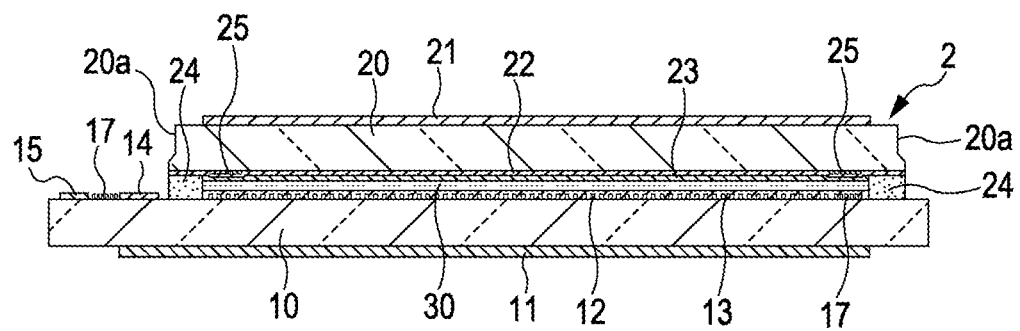

The configuration of the liquid crystal panel 2 used in the liquid crystal device 1 of FIGS. 1 to 4 is arbitrary, but in the present embodiment, an active matrix type liquid crystal panel using a thin-film transistor as a pixel switching element is used and the detailed configuration thereof will be described with reference to FIG. 5. FIG. 5A is a plan view showing the liquid crystal panel 2 and FIG. 5B is a cross-sectional view taken along line VB-VB of FIG. 5A.

In the liquid crystal panel 2 of the present embodiment, a thin-film transistor is provided on the device substrate (TFT array substrate) 10 formed of quartz, glass, silicon or the like, and the counter substrate 20 formed of glass, quart or the like and facing the device substrate 10 is provided. A pair of substrates, that is, the device substrate 10 and the counter substrate 20, are bonded by a seal material 24 provided in the periphery of the pixel region (image display region) 2A, and a liquid crystal layer 30 formed of an electro-optical material is filled between the device substrate 10 and the counter substrate 20 on the inside of the seal material 24. In FIG. 5A, a reference numeral 24a denotes a liquid injection port formed by removing a portion of the seal material 24 and a reference numeral 24b denotes a sealing material for blocking the liquid injection port 24a.

In the outer region of the seal material 24, that is, the outer peripheral region of the pixel region 2A, a data line driving circuit 14 for supplying image signals to the data lines (not shown) at predetermined time intervals and driving the data lines and an external circuit connection terminal 15 are provided along one side of the device substrate 10. Scanning line driving circuits 16 for supplying scanning signals to the scanning lines (not shown) at predetermined time intervals and driving the scanning lines that are provided on the device substrate 10 in parallel to the two adjacent sides, in which the data line driving circuit 14 is provided, at a position facing a light-shielding film 25 provided inside the seal material 24. In one residual side of the device substrate 10, a plurality of lines 17 for connecting the sides of the scanning line driving circuits 16 opposite to the side of the external circuit connection terminal 15 is provided.

Vertical conduction terminals 19 are formed on the device substrate 10 at four corners of the seal material 24, and vertical conduction materials 18, of which the lower ends are in contact with the vertical conduction terminals 19 and the upper ends are in contact with the counter electrode 22, is provided between the device substrate 10 and the counter substrate 20. Electrical conduction between the device substrate 10 and the counter substrate 20 is accomplished by the vertical conduction materials 18.

On the device substrate 10, a pixel electrode 12 configuring a pixel or the like is provided, and an alignment layer 13 is provided at the side of the liquid crystal layer 30. On the counter substrate 20, a counter electrode 22 is provided over substantially the entire surface thereof and an alignment film 23 is provided at the side of the liquid crystal layer 30. The alignment films 13 and 23 are, for example, formed of a transparent organic film such as a polyimide film, and the surfaces thereof are subjected to a rubbing process or the like such that the liquid crystal molecules in the liquid crystal layer 30 are aligned in a predetermined direction according to the voltage supplied to the liquid crystal layer 30.

Although, in the liquid crystal device 1 of FIGS. 1 to 4, the liquid crystal panel 2 of FIG. 5 are disposed and held in the frame 4 in a state in which the vertical position thereof is reversed, the direction of the liquid crystal panel 2 or the structure for holding the liquid crystal panel 2 by the frame 4 may be arbitrarily changed. In FIGS. 1 to 4, reference numerals 11 and 21 denote polarization plates provided on the device substrate 10 and the counter substrate 20 at the sides opposite to the liquid crystal layer 30, reference numerals 26 and 27 denote flexible printed circuit boards (FPCs) also functioning as conductive connection members for electrically connecting the liquid crystal panel 2 and the backlight unit 3 and an external power source or a signal input source, and reference numerals 41b and 41c denote concave portions formed in the sidewall 41 in order to prevent flexible printed circuit boards 29 and 30 from interfering with the sidewall 41 of the front side of the frame 4 when the liquid crystal panel 2 and the backlight unit 3 are received in the frame 4.

The backlight unit 3 used in the liquid crystal device 1 of FIGS. 1 to 4 has a configuration for irradiating the light from a light source such as an LED to the rear surface side of the liquid crystal panel 2 via a light guide body or a light diffusion plate, and this configuration member is covered by a casing or the like. The configuration member or the internal structure of the backlight unit 3 may be arbitrarily changed. In the drawing, the configuration member or the internal structure is omitted and only the appearance shape thereof is shown.

Figure 6A:
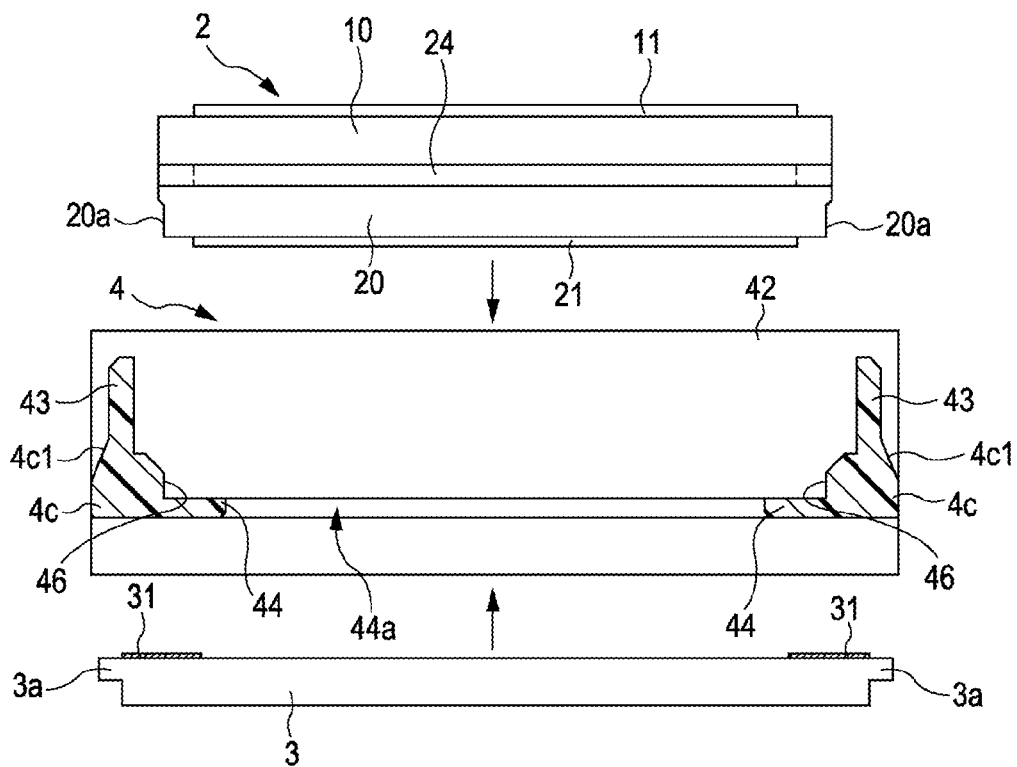
FIG. 6A is an explanatory view explaining a process of mounting a liquid crystal panel and a backlight unit in a frame and FIG. 6B is an explanatory view explaining a process of mounting a light-shielding member in the frame in which the liquid crystal panel and the backlight unit are held.

The liquid crystal panel 2 and the backlight unit 3 are received in the mounting case 6 in an arbitrary order, but, may be received in the following order. First, as shown in FIG. 6A, the liquid crystal panel 2 is inserted into the concave portion 4a of one side (the upper side of the drawing) of the frame 4 and the backlight unit 3 is inserted into the concave portion 4b of the other side (the lower side of the drawing) thereof so as to be held in the frame 4. The liquid crystal panel 2 is inserted into the concave portion 4a such that the counter substrate 20 is directed to the side of the frame 4, the inner side surface 20a is fitted to the fitting surface 46 of the sidewalls 41 to 43, and the contact portion between the liquid crystal panel 2 and the sidewalls 41 to 43 are fixed by an adhesive. The backlight unit 3 is inserted into the concave portion 4b such that the sides of the engagement protrusions 3a become the side of the support portions 44, and is fixed to the support portions 44 via a double-sided adhesive tape 31 which is a fine adhesive tape.

Figure 6B:
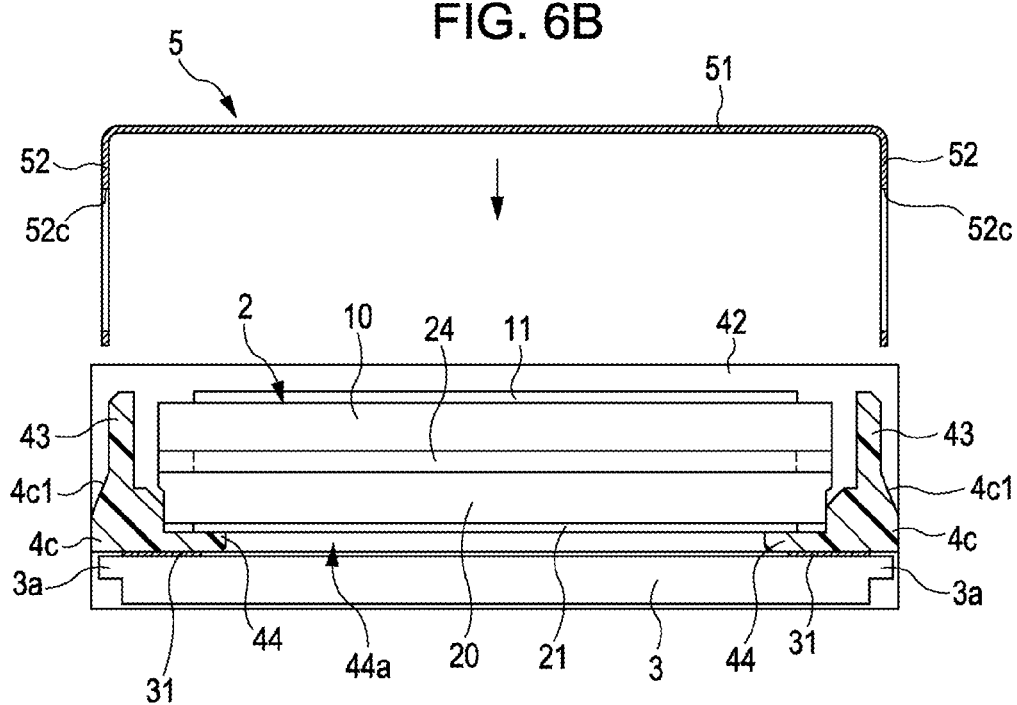

Next, as shown in FIG. 6B, the light-shielding member 5 is externally fitted to the frame 4, in which the liquid crystal panel 2 and the backlight unit 3 are held, from the side of the liquid crystal panel 2 such that the outer surface side of the liquid crystal panel 2 is covered by the top plate 51 and the portions of the outer surfaces of the facing sidewalls 43 and 43 of the frame 4 are covered by the facing sidewalls 52 and 52. During the external fitting, the sidewalls 52 of the light-shielding member 5 are pressed and opened outward by the guide protrusions 4c and the engagement protrusions 3a and the lower edges of the sidewalls 52 get over the guide protrusions 4c and the engagement protrusions 3a such that the engagement holes 52c are engaged with the engagement protrusions 3a.

When the backlight unit 3 received in the mounting case 6 is detached, tweezers or the like are inserted from the notched portion 45 formed in the sidewall 43 of the frame 4 so as to be hooked to the side surface of the backlight unit 3, and the adhesion of the double-sided adhesive tape 31 of the fine adhesion material is peeled, and the backlight unit 3 is detached.

According to the present embodiment, it is possible to easily detach the backlight unit 3 from the mounting case 6 by forming the notched portion 45 in each of the sidewalls 43 of the mounting case 6 and inserting tweezers or the like from the notched portion 45. Accordingly, for example, when a foreign matter is found between the liquid crystal panel 2 and the backlight unit 3 in the mounting case 6 during display inspection, the backlight unit 3 is detached from the mounting case 6 and the foreign matter is simply eliminated and cleaned. By inserting tweezers or the like from the notched portion 45, it is possible to perform detachment only by making contact with the side surface of the backlight unit 3 and minimally suppress the surface of the backlight unit 3 from being damaged during the detachment. By facilitating the detachment of the backlight unit 3 from the mounting case 6, when a foreign matter is inserted, the foreign matter is eliminated so as not to produce a defective product, but so as to produce a regular product. Accordingly, it is possible to improve the yield of the liquid crystal device 1 which is the electro-optical device.

By engaging the engagement holes 52c of the light-shielding member 5 with the engagement protrusions 3a of the backlight unit 3 held in the frame 4, it is possible to stably hold the liquid crystal panel 2 and the backlight unit 3 in the frame 4 and the light-shielding member 5. In addition, by releasing the engagement between the engagement holes 52c of the light-shielding member 5 and the engagement protrusions 3a of the backlight unit 3, it is possible to easily detach the liquid crystal panel 2 and the backlight unit 3. When the repair or the replacement of the liquid crystal panel 2 or the backlight unit 3 is necessary, it is possible to easily and rapidly take countermeasures. In addition, even when the liquid crystal panel 2 or the backlight unit 3 is detached, it is possible to prevent the liquid crystal panel 2 or the backlight unit 3 from being detached from the frame 4.

Modified Example of Embodiment

The invention is not limited to the above-described embodiment and modifications and changes within the range capable of achieving the advantages of the invention are included in the invention. For example, although, in the above-described embodiment, the invention is applied to the liquid crystal device as the electro-optical device and the active matrix type liquid crystal panel is used as the electro-optical panel, a passive matrix type liquid crystal panel may be used, and an electro-optical device using various types of electro-optical panels instead of the liquid crystal panel may be used.

Figure 7:
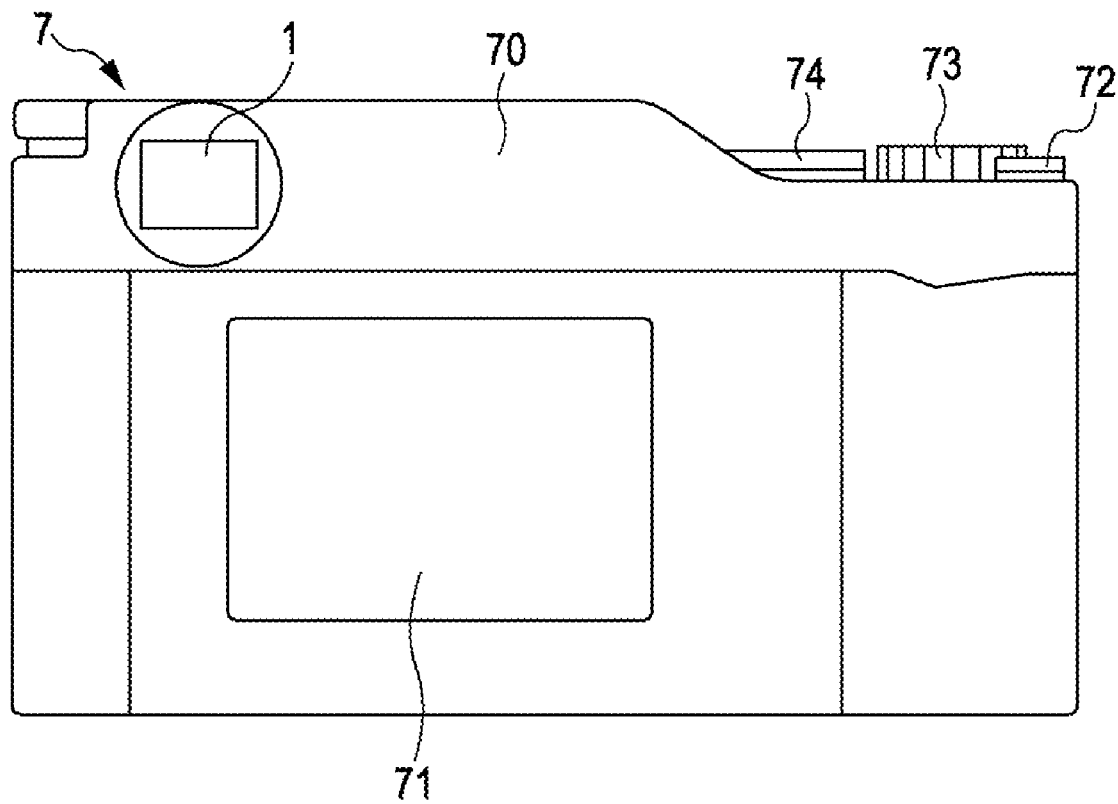
FIG. 7 is a rear-side view of a digital camera as an electronic apparatus using a liquid crystal device as an electro-optical device according to the invention.

The electro-optical device of the invention may be used as display units of various types of electronic apparatuses. FIG. 7 shows an example, in which the liquid crystal device 1 according to the embodiment is used an electronic viewfinder (EVF) of a digital camera 70 as an electronic apparatus 7. In the drawing, a reference numeral 71 denotes an image display monitor, a reference numeral 72 denotes a shutter button, a reference numeral 73 denotes a dial switch, and a reference numeral 74 denotes a power source button.

The electronic apparatus using the electro-optical device according to the invention is not limited to the digital camera 70 and is applicable to various types of electronic apparatuses. For example, the invention may be widely used in electronic apparatuses such as a portable information apparatus such as a mobile telephone or a Personal Digital Assistant (PDA), a mobile personal computer, a personal computer, a workstation, a digital camera, a vehicle monitor, a digital video camera, a liquid crystal television set, a viewfinder-type or direct-view monitor type video tape recorder, a car navigation system, a pager, an electronic organizer, an electronic calculator, a word processor, a videophone, and a POS terminal.

What is claimed is:

1. An electro-optical device comprising:
   an electro-optical panel;
   a backlight unit disposed so as to face the electro-optical panel; and
   a mounting case including a sidewall and a support portion provided inside the sidewall, the mounting case receiving the electro-optical panel from one side of the support portion and the backlight unit from the other side of the support portion, the side wall having a notch portion that faces the side surface of the backlight unit,
   wherein the mounting case includes:
      a frame which holds the electro-optical panel and the backlight unit; and
      a light-shielding member having an engagement portion engaged with the backlight unit in the sidewalls.

2. The electro-optical device according to claim 1, wherein the backlight unit is detachably fixed to the other side of the support portions.

3. The electro-optical device according to claim 2, wherein the backlight unit is fixed to the other side of the support portions by an adhesive tape.

4. The electro-optical device according to claim 1, wherein the depth of the notched portion is smaller than the thickness of the backlight unit.

5. An electronic apparatus comprising the electro-optical device according to claim 1.

6. An electro-optical device comprising:
an electro-optical panel;
a backlight unit disposed so as to face the electro-optical panel;
a mounting case including a sidewall and a support portion provided inside the sidewall, the mounting case receiving the electro-optical panel from one side of the support portion and the backlight unit from the other side of the support portion, the sidewall having a notch portion that faces the side surface of the backlight unit, the notch portion extending through the sidewall from a surface of the sidewall facing toward the backlight unit to a surface of the sidewall facing away from the backlight unit.

* * * * *